(12) United States Patent
Verbandt et al.

(10) Patent No.: US 9,686,230 B2
(45) Date of Patent: Jun. 20, 2017

(54) MANAGEMENT OF APPLICATION SERVER-RELATED USER DATA

(75) Inventors: Hugo Verbandt, Merksem (BE); Jean-Jacques Trottin, Nozay (FR); Michael Rudolph, Naperville, IL (US)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 5 days.

(21) Appl. No.: 13/496,034

(22) PCT Filed: Sep. 13, 2010

(86) PCT No.: PCT/EP2010/063356
§ 371 (c)(1),
(2), (4) Date: May 29, 2012

(87) PCT Pub. No.: WO2011/209924
PCT Pub. Date: Mar. 17, 2011

(65) Prior Publication Data
US 2012/0233298 A1    Sep. 13, 2012

(30) Foreign Application Priority Data
Sep. 14, 2009  (EP) .................................. 09305837

(51) Int. Cl.
*H04L 29/12* (2006.01)
*H04W 8/20* (2009.01)
(Continued)

(52) U.S. Cl.
CPC .... *H04L 61/1588* (2013.01); *H04L 29/12188* (2013.01); *H04L 67/306* (2013.01); *H04W 8/20* (2013.01); *H04W 92/24* (2013.01)

(58) Field of Classification Search
CPC ............ H04L 65/1016; H04L 65/1073; H04L 61/1588; H04L 67/26
(Continued)

(56) References Cited

U.S. PATENT DOCUMENTS 8,185,105 B2 * 5/2012 Zhu ................... H04L 29/12188
370/352
8,417,240 B2 4/2013 Zhu et al.
(Continued)

FOREIGN PATENT DOCUMENTS

CN     101155053     4/2008
CN     101247632     8/2008
EP     1 959 632 A1  8/2008

OTHER PUBLICATIONS

"Digital Cellular Telecommunications System (Phase 2+): Universal Mobile Telecommunications System (UMTS); LTE; IP Multimedia Subsystem (IMS) Sh Interface; Signalling Flows and Message Contents (3GPP TS 29.328 version 8.5.0 Release 8)," ETSI TS 129 328 V8.5.0, XP014044684, pp. 1-46, Jun. 1, 2009.
(Continued)

*Primary Examiner* — Jerry Dennison
(74) *Attorney, Agent, or Firm* — Fay Sharpe, LLP (57) ABSTRACT

In onse aspect, there is provided a method for the management of Application Server AS-related user data stored in a Home Subscriber Server HSS. In an embodiment, said method comprises a step of:
HSS and at least one Application Server AS, referred to as validating AS, exchanging information for the validation of a management request received at the HSS.

22 Claims, 2 Drawing Sheets

(51) Int. Cl.
*H04L 29/08* (2006.01)
*H04W 92/24* (2009.01)

(58) Field of Classification Search
USPC .............. 709/220, 227; 726/3; 370/230, 350
See application file for complete search history.

(56) References Cited

U.S. PATENT DOCUMENTS

| | | | | |
|---|---|---|---|---|
| 2005/0232406 | A1* | 10/2005 | Kauppinen | H04W 4/08 379/202.01 |
| 2005/0278447 | A1* | 12/2005 | Raether et al. | 709/227 |
| 2006/0225128 | A1* | 10/2006 | Aittola | H04L 29/12188 726/3 |
| 2007/0159976 | A1* | 7/2007 | Dekeyzer et al. | 370/236 |
| 2008/0010669 | A1* | 1/2008 | Aittola et al. | 726/3 |
| 2008/0130624 | A1* | 6/2008 | Hua et al. | 370/350 |
| 2008/0219241 | A1* | 9/2008 | Leinonen | H04L 29/12594 370/352 |
| 2008/0268847 | A1* | 10/2008 | Mukherjee et al. | 455/436 |
| 2009/0089435 | A1* | 4/2009 | Terrill | H04L 65/1069 709/227 |
| 2009/0144429 | A1* | 6/2009 | Astrom | H04L 65/40 709/227 |
| 2009/0268702 | A1* | 10/2009 | Hua | H04M 7/123 370/338 |
| 2010/0020790 | A1* | 1/2010 | Pallares Lopez | H04L 29/06027 370/352 |
| 2010/0215001 | A1* | 8/2010 | Russell | H04L 63/062 370/329 |
| 2010/0309822 | A1* | 12/2010 | Witzel | H04L 65/1096 370/259 |
| 2011/0055412 | A1* | 3/2011 | Kongalath | H04L 65/104 709/228 |
| 2012/0233298 | A1* | 9/2012 | Verbandt | H04L 29/12188 709/220 |
| 2013/0021998 | A1* | 1/2013 | Shatsky | H04W 28/26 370/329 |
| 2013/0028196 | A1* | 1/2013 | Zou | H04W 8/20 370/328 |

OTHER PUBLICATIONS

International Search Report for PCT/EP2010/063356 dated Feb. 24, 2011.

* cited by examiner

FIG_1

FIG_2

MANAGEMENT OF APPLICATION SERVER-RELATED USER DATA

CROSS-REFERENCE TO RELATED APPLICATIONS

This application is based on European Patent Application No 09305837.8 filed Sep. 14, 2009, the disclosure of which is hereby incorporated by reference thereto in its entirety, and the priority of which is hereby claimed under 35 U.S.C. §119.

FIELD OF THE INVENTION

The present invention generally relates to communication networks and systems.

BACKGROUND

A description of communication networks and systems can be found in particular in Technical Specifications published by standardisation bodies such as for example 3GPP (3rd Generation Partnership Project), . . . etc. The example of IMS (IP Multimedia Subsystem) as specified by 3GPP will be considered more particularly in the following, as an example to which the present invention applies. However the present invention is not limited to such example.

IMS architecture supports value-added services thanks to entities such as in particular Application Servers (ASs). To support such services, Application Servers interact with other entities such as in particular a subscriber database, also called Home Subscriber Server (HSS), holding subscriber data.

The interface between AS and HSS is called Sh interface, it is specified in particular in 3GPP TS 29.328 and 3GPP TS 29.329.

Data accessible via Sh interface include non-transparent data and transparent data. Non-transparent data are data that are understood both syntactically and semantically by the HSS. Transparent data are data that are not understood by the HSS. It is data that an AS may store in the HSS to support its service logic. One example is data (called Repository Data) that an AS stores in the HSS, using it as a repository. Such data repository may be shared by more than one AS implementing the same service.

Within 3GPP IMS framework, the HSS is being positioned as a centralised user profile repository that stores standard IMS-HSS user data (non-transparent data) as well as AS-related user data (transparent data, or Repository Data).

SUMMARY

There is a need for allowing an operator to manage AS-related user data such as Repository Data. Management of AS-related user data may include various operations such as user data creation, modification, deletion, . . . etc.

There is also a need for allowing an operator to manage AS-related user data while enabling data management requests received from a management system to be validated before execution. Validation may include various checkings such as:

syntax checking: for example, for management requests received from a management system via a management interface using standard message formats for data exchange (such as SOAP/XML, Corba, etc . . . ), answering such questions as: Are all attributes existing ? Is information according to the type of the attribute ? . . . etc.

consistency checking with respect to the "existing" data (for example, for a management request corresponding to a Modify request, checking that data before modification exist), as well as with respect to service global characteristic hereafter referred to as "service infrastructure data" (for example, checking if a call is not being forwarded to an emergency number).

Embodiments of the present invention in particular address such needs. More generally, it is an object of embodiments of the present invention to improve user data management in such systems.

These and other objects are achieved, in one aspect, by a method for the management of Application Server AS-related user data stored in a Home Subscriber Server HSS.

In an embodiment, said method comprises a step of:

HSS and at least one Application Server AS, referred to as validating AS, exchanging information for the validation of a management request received at the HSS.

These and other objects are achieved in other aspects, by entities such as in particular a Home Subscriber Server HSS, and an Application Server AS, for carrying out such method.

BRIEF DESCRIPTION OF THE DRAWINGS

Some embodiments of apparatus and/or methods in accordance with embodiments of the present invention are now described, by way of example only, and with reference to the accompanying drawings, in which.

DESCRIPTION OF EMBODIMENTS

Before describing FIGS. 1 to 4, some procedures on the Sh interface will briefly be recalled. The Sh interface is specified in particular in 3GPP TS 29.328 and 3GPP TS 29.329. The protocol on this interface is based on the Diameter protocol. Procedures on the Sh interface include data handling procedures and subscription/notification procedures.

Data handling procedures include the Data read (Sh-Pull) procedure invoked by the AS and used to read transparent and/or non-transparent data for a specified user from the HSS. This procedure is mapped to the Diameter commands User-Data-Request (UDR)/User-Data-Answer (UDA).

The User-Data-Request UDR in particular includes the following Information Elements IEs:

User Identity (mapped to Diameter AVP User-Identity): IMS Public User Identity, Public Service Identity, or MSISDN of the user for whom the data is required.

Requested Data (mapped to Diameter AVP Data-Reference): This IE indicates the reference to the requested information.

Service Indication (mapped to Diameter AVP Service-Indication): If Repository Data is requested, the IE Service Indication is present in the request. This IE identifies, together with the User Identity and Data-Reference, the set of service related transparent data that is being requested.

Data handling procedures also include the Data Update (Sh-Update) procedure invoked by the AS and used to allow the AS to update transparent (repository) data stored at the HSS for a specified Identity. This procedure is mapped to the Diameter commands Profile-Update-Request (PUR)/Profile-Update-Answer (PUA).

The Profile-Update-Request FUR in particular includes the following Information Elements IEs:
User Identity (mapped to Diameter AVP User-Identity): IMS Public User Identity or Public Service Identity for which data is updated.
Requested Data (mapped to Diameter AVP Data-Reference): This IE includes the reference to the data on which updates are required.
Data (mapped to Diameter AVE User-Data): Updated data.

Subscription/notification procedures include the subscription to notifications (Sh-Subs-Notif) procedure invoked by the AS and used to subscribe to notifications for when particular transparent and/or non-transparent data for a specified IMS Public User Identity or Public Service Identity is updated, from the HSS. The subscription to notifications (Sh-Subs-Notif) procedure is mapped to the Diameter commands Subscribe-Notifications-Request (SNR)/Answer (SNA).

The Subscribe-Notifications-Request SNR in particular includes the following Information Elements IEs:
User Identity (mapped to Diameter AVP User-Identity): IMS Public User Identity or Public Service Identity for which notifications of data changes are requested.
Requested Data (mapped to Diameter AVE Data-Reference): This IE includes the reference to the data on which notifications of change are required.
Service Indication (mapped to Diameter AVE Service-Indication): If notifications on changes of Repository Data are requested, the IE Service Indication is present in the request. This IE identifies, together with the User Identity and Data-Reference, the set of service related transparent data for which notifications of changes are requested.

The SNR may also include an IE Service Indication requesting that the data is sent in response. If the SNR includes the IE Service Indication, the Subscribe Notifications Answer SNA includes an Information Element Data carrying the current values of the data for which notifications have been requested.

Subscription/notification procedures also include the Notifications (Sh-Notif) procedure invoked by the HSS and used to inform the AS of changes in transparent and/or non-transparent data to which the AS has previously subscribed to receive notifications for, using Sh-Subs-Notif. The Notifications (Sh-Notif) procedure is mapped to the Diameter commands Push-Notification-Request (PNR)/Answer (PNA).

The Push-Notification-Request PNR in particular includes the following Information Elements IEs:
User Identity (mapped to Diameter AVP User-Identity): IMS Public User Identity or Public Service Identity for which data has changed.
Data (mapped to Diameter AVP User-Data): Changed data.

When data repository is updated Service-Indication and Sequence Number shall also be part of the information element User-Data.

Information elements (IEs) involved in the Push-Notification-Answer PNA in particular include the following IE:
Result (mapped to Diameter AVP Result-Code): Result of the request.

Figure 1:
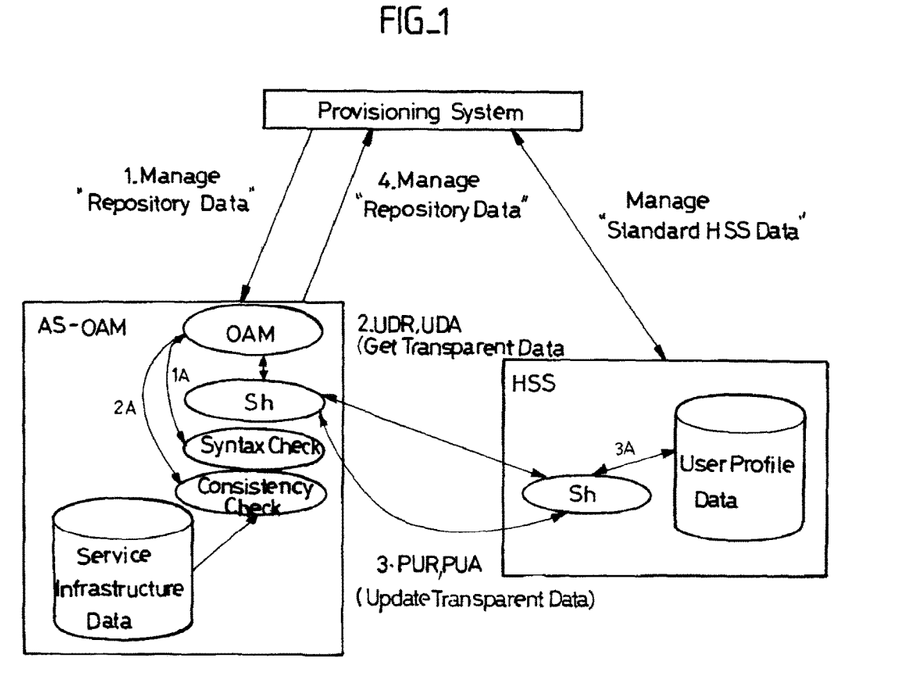
FIG. 1 is intended to illustrate a possible solution for management of AS-related user data (such as Repository Data) having some drawbacks that embodiments of the present invention enable to avoid.

FIG. 1 is intended to illustrate a possible solution for management of AS-related user data such as Repository Data having some drawbacks that embodiments of the present invention enable to avoid.

In FIG. 1, AS-related user profile data is being managed "through" the Application Server AS:
The Application Server AS provides a provisioning or management interface (e.g. SOAP/XML) towards a provisioning or management system or OSS (Operations Support System),
the Application Server AS uses the Sh interface to manage the data on the HSS.

An example of flow is illustrated in FIG. 1:
1. A provisioning or management system (e.g. SOAP/XML) requests an AS-OAM (Operation&Maintenance function in the AS) to manage user related service data (Repository Data) by means of a request noted "Manage Repository Data".
1A. The AS-OAM performs a syntactical check on the data.
2. The AS-OAM retrieves the "existing" transparent data from the HSS by means of a Sh-UDR request (User Data Request).
2A. When the data is received, the AS-OAM checks if the OAM request is consistent with respect to the "existing" data as well as with its own service global characteristics hereafter referred to as "service infrastructure data".
3. In case the validation is successful, the AS-OAM requests the HSS to update the data. This is achieved by sending a Sh-PUR (Profile Update Request) message.
3A. The HSS puts the data in its database and sends a Sh-PUA response (Profile Update Answer) to the AS-OAM.
4. The AS-OAM sends a provisioning or management answer to the provisioning or management system via the provisioning or management interface.

As recognized by the Applicant, a solution such as for example the one illustrated in FIG. 1 in particular has the following drawbacks. Although the user profile data of Application Servers may be hosted on the HSS, the operator still needs to provision or manage the data through the Application Server, because only the Application Server is able to provide the validation checks (such as syntax and consistency checking) on the request. In other words, the operator has only limited benefit from the fact that AS-related user data is centralised in the HSS.

In an embodiment, the present invention allows an operator to directly provision or manage AS-related user data on the HSS ensuring that the validations on the management requests are done.

In an embodiment, the present invention allows direct provisioning or management of Repository Data on the HSS while safeguarding the validation (such as syntax and consistency checking) by the AS, by defining new procedures and/or messages at the level of the Sh interface.

In an embodiment, the present invention provides that the Sh interface is extended to allow that HSS requests an AS to do the validation before provisioning or management of the data into the HSS database.

Various embodiments enabling validation by an Application Server will be described, each requiring varying amounts of changes at the Operation Sub-System OSS (or management system), Home Subscriber Server HSS, and Application Server AS.

Figure 2:
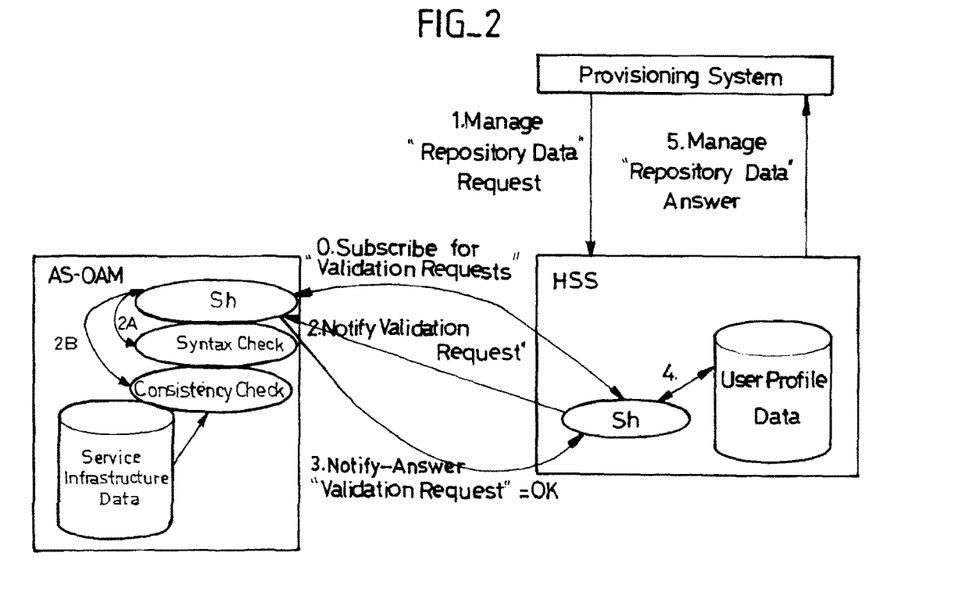
FIG. 2 is intended to illustrate management of AS-related user data (such as Repository Data) according to an embodiment of the present invention.

FIG. 2 is intended to illustrate management of AS-related user data (such as Repository Data) according to an embodiment of the present invention.

In the embodiment illustrated in FIG. 2, a provisioning or management system or OSS has an OAM or management interface to the HSS for provisioning or management of "Repository Data" (as well as standard HSS data). There is an Application Server instance AS-OAM that provides the OAM (Operation & Maintenance) function to validate the management requests.

An example of scenario is illustrated in FIG. 2:

0. The AS-OAM subscribes to the HSS to receive notifications for validation requests, by sending on Sh interface a request noted "Subscribe for Validation Requests".

1. The provisioning or management system requests the HSS to provision or manage Repository Data by sending on the management or provisioning interface (e.g. using SOAP/XML) a request noted "Manage Repository Data".

2. The HSS notifies the AS-OAM of a request for validation by sending on the Sh interface a request noted "Notify Validation Request", including the Repository Data as well as a request for validation.

2A. The AS-OAM performs a syntactical check on the data.

2B. The AS-OAM checks if the OAM request is consistent with respect to the "existing" data as well as with its own "service infrastructure data".

3. The AS-OAM responds to the HSS by sending on the Sh interface a response noted "Notify-Answer" indicating the result of the validation, for example it is considered that validation is successful.

4. The HSS provisions or manages the data on its database.

5. The HSS responds to the provisioning or management system by sending on the provisioning interface (e.g. using SOAP/XML) a response noted "Manage Repository Data", including the result of the provisioning or management, in this example that provisioning or management is successful.

An example such as the one illustrated in FIG. 2 may require some changes with respect to current procedures and/or message formats, for example:

New Sh message format enabling an AS to subscribe to notifications for validation requests; for example a new Diameter AVP "Validation Request" can be introduced in the current Subscribe-Notifications-Request SNR format, indicating subscription to notifications for validation requests.

New Sh message format enabling HSS to notify an AS having subscribed to notifications for validation requests, of a validation request (the request including the Repository Data); for example a new Diameter AVP "Validation Request" can be introduced in the current Push-Notification-Request PNR format, indicating a request for validation.

New Sh message format enabling an AS having received a validation request to send the result of the validation; for example a new Diameter AVP "Provisioning Success/Failure" can be introduced in the current Push-Notification-Answer PNA format, indicating the result of the validation.

Figure 3:
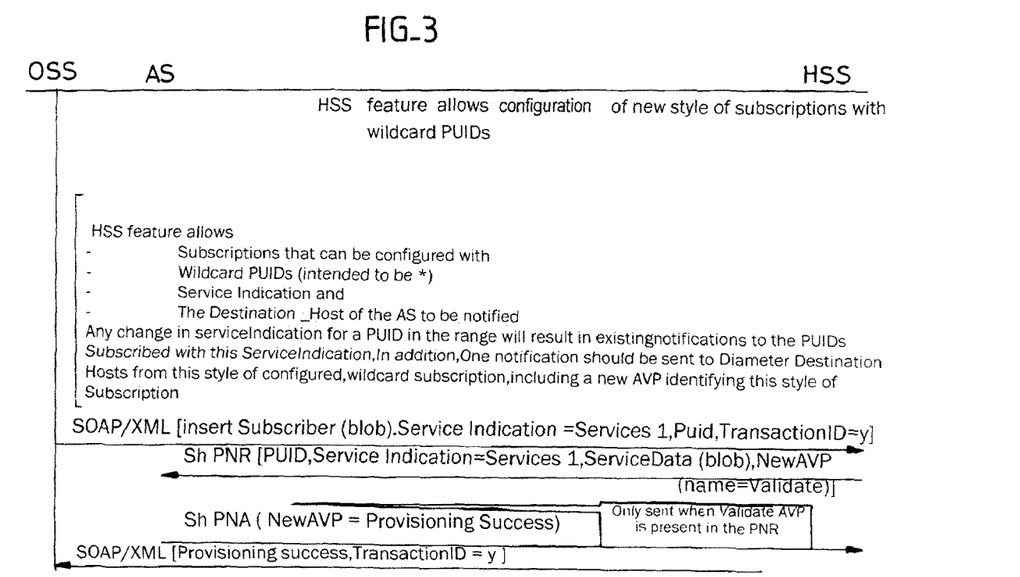
FIG. 3 is intended to illustrate management of AS-related user data (such as Repository Data) according to another embodiment of the present invention.

FIG. 3 is intended to illustrate management of AS-related user data (such as Repository Data) according to another embodiment of the present invention.

The embodiment illustrated in FIG. 3 corresponds to an alternate solution, wherein a different subscription is configured at the HSS. It is more efficient than the AS submitting the subscription since it applies to all subscribers for a named Service Indication. It does not require Application Servers with the validation role to routinely submit subscriptions for all subscribers. If data provisioned or managed in the HSS for a particular application is to be validated, then, for each Service Indication used by that application, the HSS is configured with a list of the Diameter Host names of the Application Servers that can be used to validate data changes for this Service Indication. This is a new type of subscription on the HSS, it may (in case two or more applications performing different services might choose to utilize the same piece of transparent data) require the HSS to hold confirmation of the provisioning or management request until confirmation of all of the necessary Application Servers is acknowledged.

In an embodiment, subscriptions to receive notifications for validation requests are configured at the HSS with information such as:
Service Indication,
range of PUIDs having subscribed with this Service Indication,
Diameter Destination_Host of validating AS(s) in a list of validating AS(s) that can be used for validation of data changes for this Service Indication.

According to usual subscription to notifications mechanism, any change in data for this Service Indication for a PUID in this range will result in notifications to ASs having subscribed to notifications for this PUID for this Service Indication.

In addition, with such new mechanism of subscription, a notification will be sent to a validating AS in the list of validating AS(s) that can be used to validate changes for this Service Indication, with which HSS is configured . This notification may include a new AVP indicating this new style of subscription.

An example of scenario is illustrated in FIG. 3:

1. HSS is configured with a new style of subscription as indicated above.

2. A provisioning or management system (such as Operation Sub-System OSS) sends a provisioning or management request (e.g. using SOAP/XML) to the HSS for a given Service Indication (for example noted "Services 1") for a particular subscriber (for example identified by PUID), for example to add/update a transparent data block. For example, this request includes the following information: Insert Subscriber Data (blob), Service Indication=Services 1, PUID, Transaction ID=y.

3. The HSS also sends a Sh-PNR to one of the Application Servers in the list of Application Servers that can be used to validate changes for this Service Indication, with which HSS is configured.

4. This Application Server checks if the data is valid, and includes a new AVP (with the validation result) in the Sh-PNA response.

5. Once the HSS receives a Sh-PNA response from each of the Application Servers selected to do the validation, the HSS updates the copy of the transparent data block stored in the HSS.

6. Once the HSS receives a Sh-PNA response from each of the Application Servers selected to do the validation, the HSS sends a response (e.g. using SOAP/XML) to the provisioning or management system and includes the provisioning result.

7. The HSS notifies any Application Servers that have subscribed to be notified of such a change for that particular subscriber, if any.

If the data is not valid, the HSS sends an unsuccessful answer to the OSS.

An example such as the one illustrated in FIG. 3 may require some changes with respect to current procedures and/or message formats, for example:

New HSS features allowing subscriptions that can be configured with information such as: Service Indication, Wildcard PUIDs (range of PUIDs having subscribed with this Service Indication), Diameter Destination_Host of at least one AS, referred to as validating AS, that can be used to validate data changes for this Service Indication.

New Sh message format enabling HSS to notify a validating AS that a validation has to be done; for example a new Diameter AVP "Validate" may be introduced in the Sh Push-Notification-Request PNR.

New Sh message format enabling an AS having received a validation request to send the result of the validation; for example a new Diameter AVE "Provisioning Success/Failure" may be introduced in the Sh Push-Notification-Answer PNA format.

Figure 4:
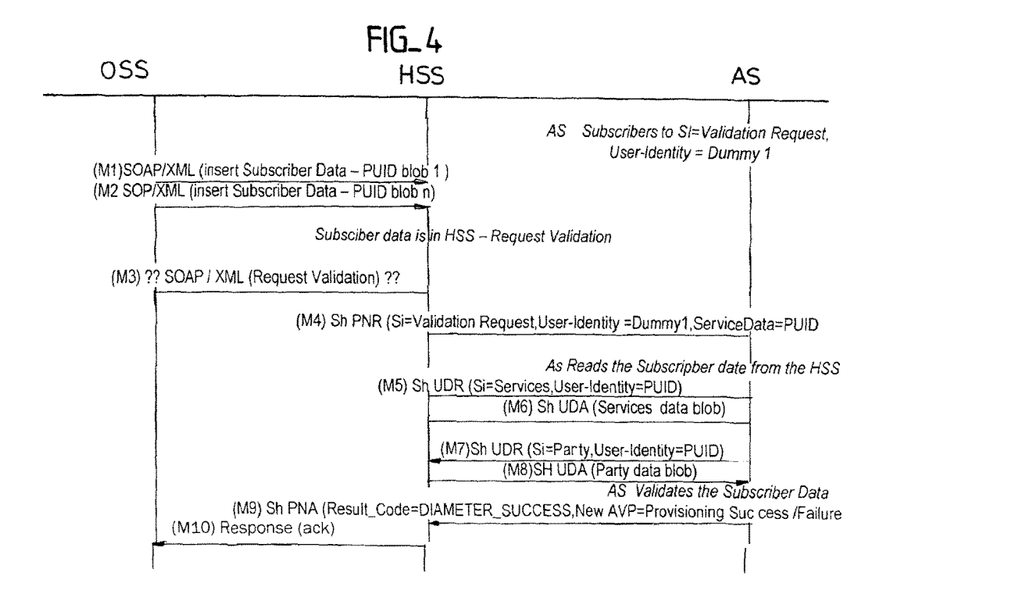
FIG. 4 is intended to illustrate management of AS-related user data (such as Repository Data) according to another embodiment of the present invention.

FIG. 4 is intended to illustrate management of AS-related user data (such as Repository Data) according to another embodiment of the present invention.

The embodiment illustrated in FIG. 4 corresponds to an alternate solution that does not require nearly as much change in standards or at the HSS.

In an embodiment, ASs that can be used for validation and HSS pre-arrange the validation task. In an embodiment, ASs that can be used for validation subscribe to notifications for a new Service Indication (for example, Service Indication name=ValidationRequest) and a token User Identity (for example, User identity name=Dummy1). If multiple ASs are involved in data validation, different User-Identities can be assigned and the OSS/HSS can distribute the requests. Either the management system OSS or the HSS triggers the Sh-Notify (PNR) to a validating AS. Upon reception of the Sh-PNR, the AS will read the data from the HSS, validate it, and then reply to the PNR.

An example of scenario is illustrated in FIG. 4:

1. The AS subscribes to notifications for a new Service Indication=ValidationRequest and a token User identity=Dummy1.

2. OSS sends to HSS a data management request, for example using SOAP/XML messages such as messages noted (M1), (M2) including information such as Insert Subscriber Data, PUID, Data (noted blob 1, blob n).

3. OSS sends to HSS a validation request, for example in the form of SOAP/XML message such as message noted (M3) including information such as Request Validation.

4. HSS sends to AS an Sh PNR message such as message noted (M4) including information such as Service Indication=ValidationRequest, User-Identity=Dummy1, ServiceData=PUID.

5. AS sends to HSS one or more Sh UDR messages such as messages noted (M5) and (M7) including User-Identity=PUID.

6. HSS sends to AS one or more Sh UDA messages such as messages noted (M6) and (M8) including the requested subscriber data.

7. AS validates the subscriber data.

8. AS sends to HSS an Sh PNA message such as message noted (M9) including information such as Result-Code=DIAMETER_SUCCESS, new AVP=Provisioning Success/Failure.

9. HSS sends to OSS a response message such as Response message noted (M10) including Ack (acknowledgement).

It could be ensured that:

the PNR/PNA sequence can tolerate timeframes containing multiple UDR/UDA exchanges.

the SOAP/XML transaction is not acknowledged until PNR is returned.

If multiple PNRs are necessary to service multiple subscriptions by separate applications, then the HSS response to the HSS occurs only after the last response is processed.

An example such as the one illustrated in FIG. 4 may require some changes with respect to current procedures and/or message formats, for example:

ASs that can be used for validation subscribe to notifications for a new Service Indication (for example Service Indication name=Request Validation) and a token User Identity (for example User Identity name=Dummy1). Upon reception of an Sh-Notify (PNR) including Service Indication=ValidationRequest and User-Identity=Dummy1, AS will read the data from the HSS, validate it, and then reply to the PNR.

Either the management system or the HSS sends to AS Sh-Notify (PNR) including information such as Service Indication=Validation Request, User-Identity=Dummy1, Service Data=PUID.

New Sh message format enabling an AS having received a validation request to send the result of the validation; for example a new Diameter AVP Provisioning Success/Failure can be introduced in the current Push-Notification-Answer PNA format.

In one aspect, there is provided a method for the management of Application Server AS-related user data stored in a Home Subscriber Server HSS.

Various embodiments are provided, which may be used alone or in combination (according to various combinations):

In an embodiment, said method comprises a step of:

HSS and at least one Application Server AS, referred to as validating AS, exchanging information for the validation of a management request received at the HSS.

In an embodiment, said method comprises the steps of:

upon reception of said management request, HSS sending to said validating AS, a request, referred to as validation request, for validation of said management request, upon reception of a validation response including validation result from said validating AS, HSS acting according to said validation result.

In an embodiment, said method comprises a step of:

upon reception of a validation request from HSS, said validating AS performing said validation and returning a response, referred to as validation response, to HSS, including validation result.

In an embodiment, said method comprises a step of:

in case the validation result indicates successful validation, HSS executing said management request in its database and returning a response to said management system.

In an embodiment, said method comprises a step of:
in case the validation result does not indicate successful validation, HSS returning a response to said management system.

In an embodiment, said method comprises a step of:
HSS executing said management request in its database before receiving said validation response, and in case the validation result indicates successful validation, HSS returning a response to said management system.

In an embodiment, said method comprises a step of:
HSS executing said management request in its database before receiving said validation response, and in case the validation result does not indicate successful validation, HSS cancelling out said management request execution and returning a response to said management system.

In an embodiment, said method comprises a step of:
HSS and said validating AS using subscription/notification mechanism over Sh interface, for subscription to receive notifications for validation requests/notification of validation requests.

In an embodiment, said method comprises a step of:
said validating AS subscribing to receive notifications for validation requests using Subscribe Notifications Request SNR over Sh interface.

In an embodiment, said method comprises a step of:
configuring HSS with information indicating subscription of said validating AS to receive notifications for validation requests.

In an embodiment, said method comprises a step of:
HSS notifying said validating AS of a validation request using Push Notification Request PNR over Sh interface.

In an embodiment, said data include Repository Data stored in HSS per User Identity and Service Indication.

In an embodiment, said method comprises a step of:
said validating AS subscribing to receive notifications for validation requests for a User Identity and a Service Indication by sending to HSS a Sh-SNR carrying said User Identity, said Service Indication, and information indicating that said validating AS subscribes to receive said notifications.

In an embodiment, said User Identity is carried in the IE User Identity of said Sh-SNR, said Service Indication is carried in the IE Service Indication of said Sh-SNR, and said information indicating that said validating AS subscribes to receive said notifications is carried in a specific IE of said Sh-PNR.

In an embodiment, said method comprises a step of:
said validating AS subscribing to receive notifications for validation requests for a Service Indication by sending to HSS a Sh-SNR carrying said Service Indication and information indicating that said AS can be used for said validation.

In an embodiment, said information indicating that said AS can be used for said validation is carried in the IE Service Indication of said Sh-SNR, and said Service Indication is carried in the IE User Identity of said Sh-SNR.

In an embodiment, information configured at HSS and indicating subscription of said validating AS to receive notifications for validation requests for a Service Indication include said Service Indication, information identifying said AS, and information indicating a range of User Identities having subscribed with said Service Indication.

In an embodiment, said method comprises a step of:
HSS notifying said validating AS having subscribed to receive notifications for validation requests for a User Identity and a Service Indication, of a validation request, by sending to said validating AS a Sh-PNR carrying said User Identity, said Service Indication, user data contained in a received management request, and information indicating that validation is requested.

In an embodiment, said method comprises a step of:
HSS notifying said validating AS having subscribed to receive notifications for validation requests for a Service Indication, of a validation request, by sending to said validating AS a Sh-PNR carrying said Service Indication, a User Identity carried in a received management request, and information indicating that validation is requested.

In an embodiment, said information indicating that validation is requested is carried in the IE Service Indication of said Sh-PNR, said Service Indication is carried in the IE User Identity of said Sh-PNR, and said User Identity is carried in the IE Service Data of said Sh-PNR.

In an embodiment, said method comprises a step of:
upon receiving said Sh-PNR, said validating AS downloading from HSS user data contained in a received management request, using User Data Request UDR over Sh interface.

In an embodiment, said method comprises a step of:
HSS notifying said validating AS whose subscription to receive notifications for validation requests for a Service Indication and a range of User Identities is configured at HSS, of a validation request for said service Indication and for a User Identity in said range, by sending to said validating AS a Sh-PNR carrying said User Identity, said Service Indication, and information indicating that validation is requested.

In an embodiment, said User Identity is carried in the IE User Identity of said Sh-PNR, said Service Indication is carried in the IE Service Indication of said Sh-PNR, and said information indicating that validation is requested is carried in a specific IE of said Sh-PNR.

In an embodiment, said method comprises a step of:
said validating AS sending a validation response to HSS using Push Notification Answer PNA over Sh interface.

In another aspect, there is provided an Application Server, configured to perform such method.

In another aspect, there is provided a Home Subscriber Server, configured to perform such method.

The detailed implementation of the above-mentioned configuration does not raise any special problem for a person skilled in the art, and therefore such means do not need to be more fully disclosed than has been made above, by their function, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for the management of Application Server (AS)-related user data stored in a Home Subscriber Server (HSS), said method comprising:

a request for said management of AS-related user data, referred to as a management request, received at said HSS, is validated by at least one IP Multimedia Subsystem (IMS) AS before being executed at said HSS, wherein said IMS AS comprises a validating AS;
wherein information is exchanged between said HSS and said at least one IMS AS, for said validation of said management request.

2. The method according to claim 1, further comprising:
upon reception of said management request, said HSS sending to said validating AS, a request referred to as a validation request for validation of said management request,
upon reception of a validation response including a validation result from said validating AS, said HSS acting according to said validation result.

3. The method according to claim 1, further comprising:
said HSS using a subscription/notification mechanism over an Sh interlace for subscriptions to receive notifications for validation requests and notifications of validation requests.

4. The method according to claim 1, further comprising:
configuring said HSS with information indicating subscription of said validating AS to receive notifications for validation requests.

5. The method according to claim 1, further comprising:
said HSS notifying said validating AS of a validation request using a Push Notification Request (PNR) over an Sh interface.

6. The method according to claim 1, wherein said data include Repository Data stored in said HSS per User Identity and Service Indication.

7. The method according to claim 6, wherein said User Identity is carried in the IE User Identity of said Sh-SNR, said Service Indication is carried in the IE Service Indication of said Sh-SNR, and said information indicating that said validating AS subscribes to receive said notifications is carried in a specific IE of a Push Notification Request (PNR) over an Sh interface (Sh-PNR).

8. The method according to claim 1, wherein information configured at said HSS and indicating subscription of said validating AS to receive notifications for validation requests for a Service Indication include said Service Indication, information identifying said AS, and information indicating a range of User Identities having subscribed with said Service Indication.

9. The method according to claim 1, further comprising:
said HSS notifying said validating AS having subscribed to receive notifications for validation requests for a User Identity and a Service Indication, of a validation request, by sending to said validating AS an Sh-PNR carrying said User Identity, said Service Indication, user data contained in a received management request, and information indicating that validation is requested.

10. The method according to claim 1, further comprising:
said HSS notifying said validating AS having subscribed to receive notifications for validation requests for a Service Indication, of a validation request, by sending to said validating AS an Sh-PNR carrying said Service Indication, a User Identity carried in a received management request, and information indicating that validation is requested.

11. The method according to claim 10, wherein said information indicating that validation is requested is carried in the IE Service Indication of said Sh-PNR, said Service Indication is carried in the IE User Identity of said Sh-PNR, and said User Identity is carried in the IE Service Data of said Sh-PNR.

12. The method according to claim 1, further comprising:
said HSS notifying said validating AS whose subscription to receive notifications for validation requests for a Service Indication and a range of User Identities is configured at HSS, of a validation request for said service Indication and for a User Identity in said range, by sending to said validating AS an Sh-PNR carrying said User Identity, said Service Indication, and information indicating that validation is requested.

13. The method according to claim 9, wherein said User Identity is carried in the IE User Identity of said Sh-PNR, said Service Indication is carried in the IE Service Indication of said Sh-PNR, and said information indicating that validation is requested is carried in a specific IE of said Sh-PNR.

14. A Home Subscriber Server (HSS) comprising a processor and memory storing instructions that, when executed, cause the HSS to perform the method according to claim 1.

15. A method for the management of Application Server (AS)-related user data stored in a Home Subscriber Server (HSS), said method comprising:
a request for said management of AS-related user data, referred to as a management request, received from said HSS, is validated by at least one IP Multimedia Subsystem (IMS) AS before being executed at said HSS, wherein said IMS AS comprises a validating AS;
said at least one IMS AS exchanging information with said HSS for said validation of said management request.

16. The method according to claim 15, further comprising:
upon reception of a request referred to as a validation request from said HSS, said validating AS performing said validation and returning a response, referred to as validation response, to HSS, including a validation result.

17. The method according to claim 15, further comprising:
said validating AS subscribing to receive notifications for validation requests using Subscribe Notifications Request (SNR) over an Sh interface.

18. The method according to claim 15, further comprising:
said validating AS subscribing to receive notifications for validation requests for a User Identity and a Service Indication by sending to said HSS an Sh-SNR carrying said User Identity, said Service Indication, and information indicating that said validating AS subscribes to receive said notifications.

19. The method according to claim 15, further comprising:
said validating AS subscribing to receive notifications for validation requests for a Service Indication by sending to said HSS an Sh-SNR carrying said Service Indication and information indicating that said AS can be used for said validation.

20. The method according to claim 19, wherein said information indicating that said AS can be used for said validation is carried in the IE Service Indication of said Sh-SNR, and said Service Indication is carried in the IE User Identity of said Sh-SNR;

upon receiving an Sh-PNR, said validating AS downloading from HSS user data contained in a received management request, using User Data Request (UDR) over Sh interface.

21. The method according to claim 15, further comprising:
said validating AS sending a validation response to said HSS using a Push Notification Answer (PNA) over an Sh interface.

22. An IMS Application Server (AS) comprising a processor and memory storing instructions that, when executed, cause the IMS AS to perform the method according to claim 15.

* * * * *